June 10, 1952 — M. C. LUTERICK — 2,600,009
ICE-CREAM WHIPPING MACHINE
Filed Dec. 12, 1949 — 2 SHEETS—SHEET 1

MARCELLUS C. LUTERICK,
INVENTOR.

ATTORNEY

June 10, 1952  M. C. LUTERICK  2,600,009
ICE-CREAM WHIPPING MACHINE
Filed Dec. 12, 1949  2 SHEETS—SHEET 2

MARCELLUS C. LUTERICK,
INVENTOR.

BY James M. Abbett

ATTORNEY

Patented June 10, 1952

2,600,009

UNITED STATES PATENT OFFICE 2,600,009

ICE-CREAM WHIPPING MACHINE

Marcellus C. Luterick, Montrose, Calif., assignor to Arden Farms Co., Los Angeles, Calif., a corporation of Delaware Application December 12, 1949, Serial No. 132,499

3 Claims. (Cl. 259—43)

This invention relates to the treatment of ice cream, as generally indicated in my co-pending application entitled Ice Cream Softener, filed by me in the United States Patent Office on August 30, 1949, and bearing Serial No. 113,054, now Patent No. 2,516,895, dated August 1, 1950, and the present invention is particularly concerned with an ice cream whipping machine.

This application is a continuation-in-part of said Patent No. 2,516,895, the latter disclosing an ice-cream softener including a vertically disposed container at the bottom of which an ice cream whipping device is disposed for rotation about a vertical axis from beneath, the container also carrying an outlet spout at the lower end thereof from which fluid ice cream may be discharged. The purpose of said ice cream softener is to provide a small and inexpensive machine into which relatively hard, solid, frozen ice cream may be dropped, either in the form of frozen cubes or as scooped up by a hemispherical dipper, the rapid rotation of the whipping element quickly reducing the hard ice cream to a soft fluid mass which will readily flow from the outlet spout at the lower end of the container when a valve controlling this spout is opened.

The type of whipping device specifically claimed in said patent comprises a circular disc designed to be mounted within the bottom of the container and substantially of a diameter equal thereto, a plurality of inclined radially extending tines emanating from said disc with their ends terminating adjacent the wall of the container, a ring embracing said tines and being of a diameter less than the diameter of the container, said tines and ring forming a basket structure whereby relatively hard pieces of ice cream may be broken into smaller particles and retained in said basket-like structure while being reduced to a fluid state.

I have discovered that the modified unclaimed form of whipping element illustrated in Fig. 7 of said patent operates to more rapidly reduce the hard cream placed in the container to a soft consistency by virtue of tip portions of the tines thereof extending upwardly above said ring in approximate parallelism with the axis of rotation of the whipping element. I have also discovered that the speed of reduction of the solid ice cream to a fluid consistency may be still further accelerated by reducing the number of said tines, the optimum speed of conversion having been found to be obtained by the use of four such tines.

It is accordingly an object of the invention covered in the present application to provide a whipping device for use in an ice cream whipping machine by which the reduction of solid ice cream to a fluid mass may be effected with the maximum practical rapidity.

The invention is illustrated by way of example in the accompanying drawings, in which:

Fig. 4 is a view in side elevation showing the whipping element disassociated from the container and drive.

Fig. 5 is a view in vertical section and elevation as seen on the line 5—5 of Fig. 3, and shows the valve latch structure.

Figure 1:
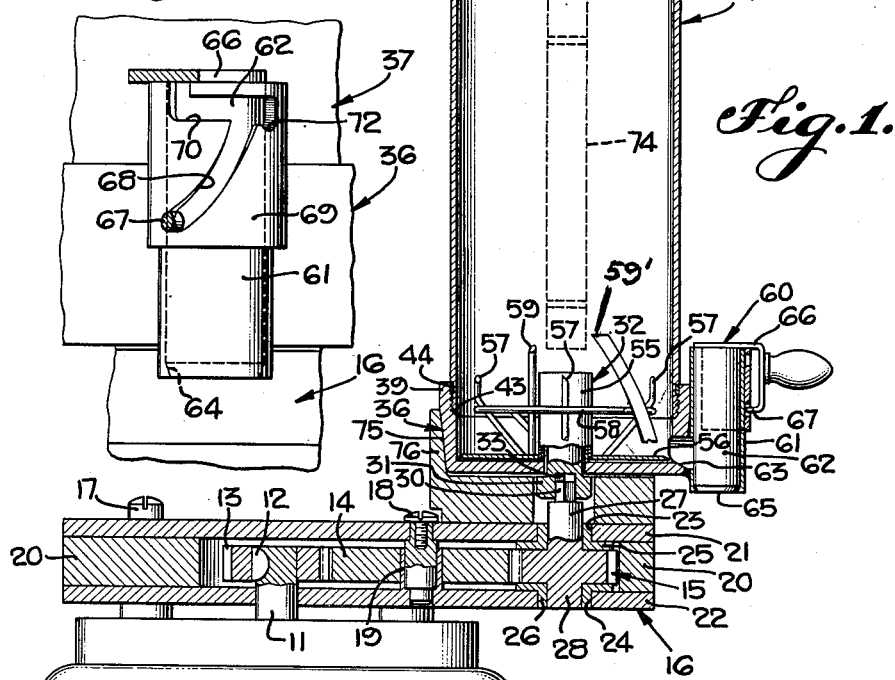
Figure 1 is a view in vertical section and elevation showing the completely assembled whipping device.
Figure 2:
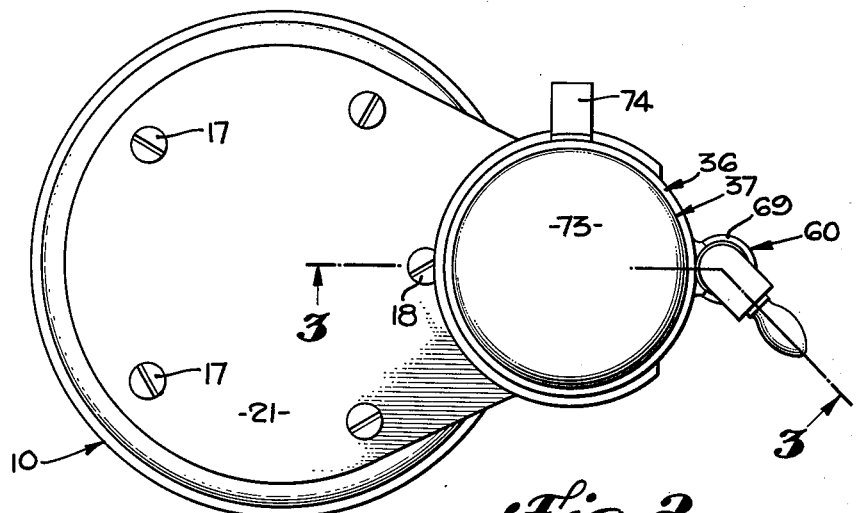
Fig. 2 is a view in plan showing the container and the valve associated therewith.
Figure 3:
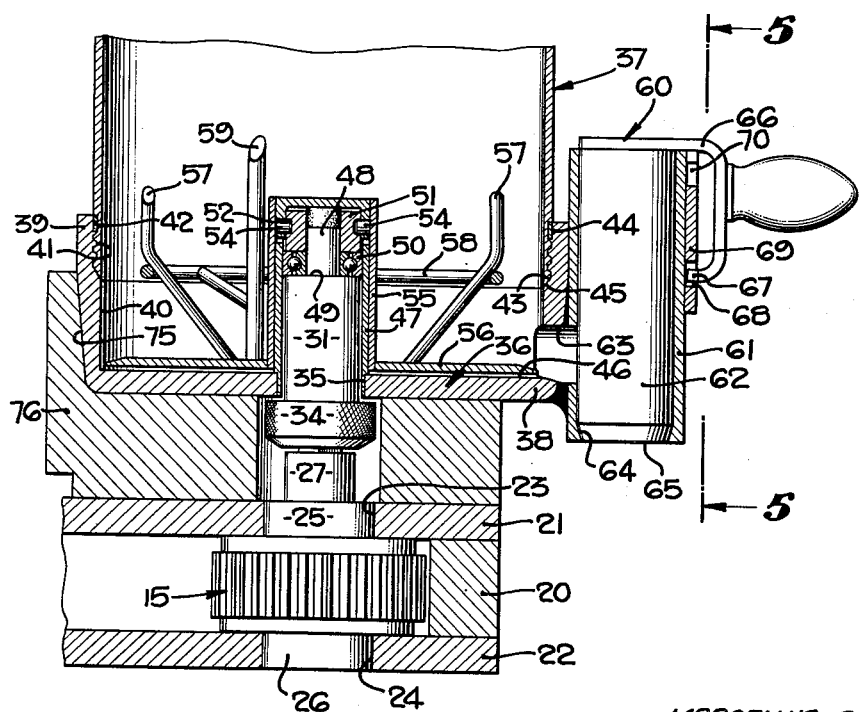
Fig. 3 is an enlarged fragmentary view in vertical section, as seen on the line 3—3, Fig. 2, showing the lower end of the container, the whipping element mounted therein, and the discharge valve associated therewith.

Referring more particularly to the drawings, 10 indicates a base structure which includes a driving motor, having its shaft 11 disposed vertically and projecting upwardly from the base and the motor. Secured to the shaft 11 by key 12 is a gear pinion 13 which is in mesh with an intermediate driving gear 14. The driving gear 14 is in mesh with a driven gear 15, thus the gears 12, 14 and 15 provide a gear train. This train of gears is enclosed within a gear case 16, which is secured to the base structure 10 by screws 17 and 18. The screw 18 also provides a spindle for the intermediate driving gear 14. This gear is mounted upon the spindle by a bushing 19. The gear case includes a filler plate 20 and upper and lower plates 21 and 22. The plates 21 and 22 are formed with vertically aligned bores 23 and 24 respectively. These bores receive bushings 25 and 26. The bushings rotatably support projecting spindles 27 and 28 which are formed integral with and at the upper and lower sides of the driven gear 15. It will be seen by reference to Figure 1 that the gear case 16 overhangs the base structure 10 at one of its sides. This is for a purpose to be hereinafter pointed out.

The upper spindle 27 is formed with a hexagonal extension 30, which provides a driving connection with spindle 31 of the whipping unit 32. The lower end of the spindle is formed with a broached recess 33 to receive the portion 30 and to form a driving connection therewith. The spindle 31 is also formed at its lower end with an enlarged knurled head 34 which provides means whereby an operator may rotate the spindle 31 manually. The spindle 31 extends upwardly through an opening 35 in a bottom fitting 36 which forms a closure for the lower end of a cylindrical whipping container 37. The bottom fitting 36 is formed with a floor 38 and an upwardly extending cylindrical flange 39. The flange 39 forms a smooth cylindrical wall 40 at its lower portion and is internally threaded at its upper edge as indicated at 41. The thread is preferably a coarse thread and terminates at its upper end in a cylindrical counterbore 42 and at its lower end in a tapered face 43. The counterbore 42 accommodates a packing washer 44 and the inclined face 43 provides an abutment against which the lower tapered end 45 of the wall of the cylindrical container 37 abuts when the fitting 36 and the container 37 are assembled. Attention is directed to the fact that the coarse thread 41 makes it possible for the threads to be easily cleaned and insures that extraneous matter will not accumulate in the threads to cause an unsanitary condition, since the product treated in the container has the characteristic of developing bacteria rapidly. The bottom portion 38 of the fitting has a smooth, flat surface 46 which is presented upwardly for a purpose to be hereinafter described.

The central bore 35 which extends through the bottom portion 38 of the fitting 36 receives a fixed sleeve 47, the lower end of which is reduced in diameter to provide a shoulder resting against the smooth surface 46 of the member 38. The sleeve extends vertically and centrally of the fitting 36 and the container 37. The internal diameter of the sleeve 47 is substantially greater than the outside diameter of the spindle 31. The upper end of the spindle 31 is formed with a reduced portion 48 providing a shoulder 49 upon which anti-friction bearing 50 is mounted. The inner race of the bearing 50 fits the reduced portion 48 of the spindle, and the outer race of the bearing 50 fits the central bore of the sleeve 47 so that the spindle will be free to rotate in the sleeve.

Secured upon the upper end of the extension 48 is a collar 51 which is fixed in position upon the extension and holds the bearing 50 in place. The collar 51 is formed at diametrically opposite sides with longitudinal slots 52 which terminate in grooves 53 extending circumferentially of the collar 51 and inclined. These slots act as part of bayonet joints and receive inwardly extending pins 54 which are mounted upon diametrically opposite sides of a rotary sleeve or hub 55 of the whipping unit 32. Thus hub telescopes over the stationary sleeve 47 and carries a smooth, flat disk 56 at its lower end. The disk 56 lies parallel to the base 46 of the bottom wall 38 and travels thereover as it rotates with the sleeve 55.

It should be explained that in treating ice cream to reduce it to a fluid consistency in a structure at the present time, there is a possibility that the ice cream will freeze around the whipping unit and place an overload on the motor. It is desirable, therefore, to mount the unit 32 so that it may rotate freely and so that there is substantially a liquid trap which would prevent liquids from working between the rotating sleeve 55 and the fixed sleeve 47 as well as around the spindle 31. This is accomplished in the present case by providing the anti-friction bearing 50 to insure free rotation of the sleeve 55 and the spindle 31, and also by extending the fixed sleeve 47 upwardly between the spindle 31 and the movable sleeve 55 to a height above the normal level of accumulated fluids within the container and its fittings.

The solid ice cream is reduced to a fluid state by the whipping unit which comprises the disk 56 and the series of relatively small whipping tines 57 which are spaced at ninety degrees to each other around the axis of the whipping unit 32 and are fixed at their lower ends upon the disk 56. The body of these tines extends upwardly and outwardly and the tines are held together by a ring 58 which is soldered or welded to said tines adjacent to the upper ends of their inclined portions. The upper tip portions of the tines extend vertically above the ring 58. It will thus be seen that the tines and the ring combine to form a basket-like structure into which the solid ice cream may be caught as the whipping unit 32 rotates. This tends to hold the solid melting ice cream away from the side walls of the container 37 so that a mass of ice cream will not accumulate and freeze to the side walls. In order to aid further in breaking up the larger masses of ice cream a vertical tine 59 projects upwardly from the disk 56 and to a height greater than the upper ends of the tines 57. It is preferable that the terminating ends of all of the tines shall be formed with inclined tapered faces so that the ends will be pointed to penetrate masses of ice cream as the whipping unit 32 rotates at a relatively high rate of speed.

This material is withdrawn from the container while in a fluid state by permitting it to flow through a valve structure 60. This valve structure comprises an outer cylindrical barrel 61 formed integral with or fixed upon the outer circumference of the bottom fitting 36. The axis of the valve housing extends parallel to the vertical axis of the container 37 and receives a valve plunger 62 which may move vertically within the housing to assume an obstructing position across a drain opening 63 formed through the wall of the fitting 36 and permitting fluid material formed within the container to drain out of the container. The plunger 62 is of sufficient weight to cause it to drop downwardly within the barrel 61 so that its lower end will engage a tapered face 64 formed around the discharge opening 65 of the barrel 61. A handle 66 is fastened to the plunger 62 and is formed with a finger 67 which may move along a longitudinal slot 68. The finger 67 normally assumes a position near the lower end of the slot 68 as shown in Fig. 5 of the drawings, and at which time the plunger 62 is free to rest against the tapered seat 64. The longitudinal slot 68 is formed in the outer circumference of a plate 69 which is secured around a portion of the upper end of the barrel 61. The upper end of the longitudinal slot 68 communicates with a transverse slot 70 intermediate its ends. One end of the transverse slot is formed with an open passageway 71 to permit the plunger to be removed instantly from the valve 61. The other end of the transverse slot 70 is formed with a notched recess 72 into which the finger 67 may be moved to temporarily hold the finger 67 and the plunger 62 in their uppermost positions when the valve is opened.

For convenience the container 37 is fitted with a removable cover 73 and also carries a handle 74 by which the entire container structure, including the element 36 and the cylindrical portion 37, may be moved as a unit. A portion of the outer circumference of the element 37 has a tapered face as indicated 75 and may fit into a seat structure 76 secured upon the gear case 16.

In the operation of the present invention the structure is assembled as shown in the drawings with a motor incorporated in the base 10 and the gear structure 16 mounted thereabove. The container 37 and its base element 36 are disposed in the seat 38. At this time the hexagonal end 30 extends into the recess 33 of the spindle 31 and the spindle 31 is therefore driven through the gear train from the motor in the base 10. It will be understood that previous to the use of this structure the container 37 has been removed and separated from the element 36 so that these parts could be thoroughly cleaned and sterilized and that the whipping unit 32 can be also cleaned and sterilized. Attention is called to the fact that the construction of the valve 60 makes it possible for the plunger 62 to be quickly removed from the barrel 61 so that a smooth, unobstructed bore will occur through the barrel 61 and so that the plunger 62 which is also smooth may be cleaned easily. The valve plunger 62 may be easily replaced in the barrel 61 and the whipping unit may be easily mounted upon the spindle 31 by passing the lock pins 54 downwardly through the slots in the sides of the spindle 31 and then rotating the sleeve to force the lock pins downwardly through the grooves 52 along the circumferential and inclined recess 53 in the collar 51 carried by the spindle 31. The motor may then be started, after which scoopsful of ice cream or squares of ice cream such as are known commercially as "diced ice cream," may be placed in the container 37 and reduced to a fluid state by the whipping element 31 as it rotates. Attention is directed to the fact that the whipping element 32 does not break or chop up the mass of ice cream, but its tines of relatively small sections act to whip the ice cream and to produce a semi-solid product of desirable texture and uniform consistency. If desired, flavoring such as syrups or solid products such as fresh fruit may be placed in the container to give the product a required flavor. When ice cream has been reduced to a desired consistency, the valve plunger 62 may be manipulated to allow the fluid product to flow from the element 36 through the opening 63 and to the interior of the barrel 61. When a desired quantity of the ice cream product has been withdrawn from the container, the valve plunger 62 may then be lowered so that its lower square edge will engage the tapered face 64 in the throat of the barrel 61. This will act to interrupt the flow of fluid ice cream completely and insure that it will not drop during the whipping operation.

In order to insure that the whipping unit 32 is held firmly upon the spindle 31, a neoprene lock bumper is inserted in the end of the collar 51 and is borne against by the closed end of the rotary sleeve 55 with sufficient compression so that the bayonet lock pins 54 will be held firmly in the lock slots 52 on the collar. It also should be pointed out that all of the parts of the structure save the neoprene collar are made of stainless steel and will not therefore tarnish or corrode and may easily be sterilized.

Attention is directed to the fact that in order to insure that there will not be an accumulation of material on the wall of the member 37 during the whipping operation, a scraping blade 59' is secured to the ring 58 and extends upwardly from the disk 57. This blade is slightly inclined to the vertical and moves in close relation to the surface of the container 37 to scrape any accumulation from the frozen product from the container wall and to prevent a bond between the mass of material carried within the confines of the whipping unit. It is also to be pointed out that the vertical pin 59 will act to stir the product near the axis of rotation of the whipping unit.

It will thus be seen that the structure here disclosed provides a means whereby quantities of solid ice cream may be easily and rapidly reduced to a fluid or semi-solid state in a structure which is entirely sterile and will not allow the product to become contaminated with any extraneous matter in the driving mechanism. It is also to be pointed out that the valve structure is simple in design, insures that the valve may be cleaned easily, and that it may be opened and closed by a simple positive operation.

While I have shown the preferred form of the present invention, it is to be understood that various changes in the combination, construction and arrangement of parts may be made by those skilled in the art without departing from the spirit of the invention as claimed.

Having thus described my invention, what I claim and desire to secure by Letters Patent is:

1. A whipping device for use within a container of an ice cream softening machine, said device comprising a circular disc designed to be rotatably mounted within the bottom of the container and substantially equal in diameter thereto; a horizontal ring of substantially less diameter than said disc and supported thereon in upwardly spaced relation by a plurality of tines secured both to said ring and to said disc, substantial tip portions of said tines being disposed above said ring and approximately parallel with the axis of said container whereby said upper tip portions of said tines engage a body of hard ice cream dropped into said container, when said device is being rapidly rotated, at points spaced substantial distances inwardly from said container wall, whereby the effect of said rotation is to relatively rapidly reduce the solid ice cream to a fluid mass.

2. A combination as in claim 1 in which said tines are four in number and are disposed uniformly ninety degrees apart about said disc.

3. A combination as in claim 2 in which said whipping device includes a vertical tine mounted on said disc and extending vertically upwardly therefrom at a point which is eccentrically related to said disc and is disposed a substantial distance inwardly from the upper tip portions of the other tines; and a scraper blade mounted on the periphery of said disc and shaped to travel close to the inner surface of said container to continually scrape therefrom any ice cream thrown outwardly thereagainst by the rotation of said device.

MARCELLUS C. LUTERICK.

REFERENCES CITED

The following references are of record in the file of this patent:

UNITED STATES PATENTS

| Number | Name | Date |
| --- | --- | --- |
| 1,387,380 | Fryer | Aug. 9, 1921 |
| 1,533,708 | Pfouts | Apr. 14, 1925 |
| 2,116,556 | Bellis | May 10, 1938 |
| 2,159,450 | Parcell | May 23, 1939 |
| 2,213,680 | Share | Sept. 3, 1940 |
| 2,240,213 | Fromm | Apr. 29, 1941 |
| 2,313,760 | McLean | Mar. 16, 1943 |
| 2,445,617 | Hoffman | July 20, 1948 |
| 2,516,895 | Luterick | Aug. 1, 1950 |